United States Patent
Reckmann et al.

(10) Patent No.: US 11,603,714 B2
(45) Date of Patent: Mar. 14, 2023

(54) VIBRATION ISOLATING COUPLER FOR REDUCING VIBRATIONS IN A DRILL STRING

(71) Applicants: Hanno Reckmann, Nienhagen (DE); Volker Peters, Wienhausen (DE); Axel Ritter, Lower Saxony (DE); Jannik P. Hartmann, Hannover, DE (US)

(72) Inventors: Hanno Reckmann, Nienhagen (DE); Volker Peters, Wienhausen (DE); Axel Ritter, Lower Saxony (DE); Jannik P. Hartmann, Hannover, DE (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 57 days.

(21) Appl. No.: 17/018,087

(22) Filed: Sep. 11, 2020

(65) Prior Publication Data

US 2021/0079736 A1 Mar. 18, 2021

Related U.S. Application Data

(60) Provisional application No. 62/899,332, filed on Sep. 12, 2019, provisional application No. 62/899,354, (Continued)

(51) Int. Cl.
*E21B 17/07* (2006.01)
*E21B 17/042* (2006.01)
(Continued)

(52) U.S. Cl.
CPC ........ *E21B 17/076* (2013.01); *E21B 17/0423* (2013.01); *E21B 17/10* (2013.01);
(Continued)

(58) Field of Classification Search
CPC .............. E21B 17/0423; F16F 2236/08; F16F 2236/024
See application file for complete search history.

(56) References Cited

U.S. PATENT DOCUMENTS

| | | | |
|---|---|---|---|
| 2,585,382 | A | 2/1952 | Guernsey |
| 2,834,225 | A | 5/1958 | Carter et al. |
| | | (Continued) | |

FOREIGN PATENT DOCUMENTS

| | | |
|---|---|---|
| CN | 103939092 A | 7/2014 |
| DE | 102017004126 A1 | 10/2018 |
| | (Continued) | |

OTHER PUBLICATIONS

Aiken ID, Nims DK, Whittaker AS, Kelly JM. "Testing of Passive Energy Dissipation Systems". Earthquake Spectra. 1993;9(3):335-370.

(Continued)

*Primary Examiner* — D. Andrews
(74) *Attorney, Agent, or Firm* — Cantor Colburn LLP

(57) ABSTRACT

A vibration isolating coupler including a first coupler portion, a second coupler portion including an external surface and an internal surface portion, and a vibration isolating portion extending between the first coupler portion and the second coupler portion. The vibration isolating portion including a first solid annular portion and a second solid annular portion. The vibration isolating portion including a plurality of slots extending from the first solid annular portion toward the second solid annular portion forming a plurality of vibration isolating elements. Each of the plurality of vibration isolating elements is disconnected from adjacent ones of the plurality of vibration isolating elements by a corresponding one of the plurality of slots. The plurality of vibration isolating elements enabling torsional rotation of (Continued)

the first coupler portion relative to the second coupler portion.

21 Claims, 9 Drawing Sheets

Related U.S. Application Data filed on Sep. 12, 2019, provisional application No. 62/899,291, filed on Sep. 12, 2019, provisional application No. 62/899,331, filed on Sep. 12, 2019.

(51) Int. Cl.
| | |
|---|---|
| *F16F 15/121* | (2006.01) |
| *F16F 9/52* | (2006.01) |
| *F16F 15/173* | (2006.01) |
| *E21B 17/10* | (2006.01) |
| *F16F 15/129* | (2006.01) |
| *E21B 17/00* | (2006.01) |
| *F16F 15/16* | (2006.01) |
| *F16F 15/18* | (2006.01) |

(52) U.S. Cl.
CPC .............. *F16F 9/52* (2013.01); *F16F 15/129* (2013.01); *F16F 15/1216* (2013.01); *F16F 15/173* (2013.01); *E21B 17/006* (2013.01); *F16F 15/16* (2013.01); *F16F 15/18* (2013.01); *F16F 2222/02* (2013.01); *F16F 2232/02* (2013.01); *F16F 2236/08* (2013.01); *F16F 2238/024* (2013.01)

(56) References Cited

U.S. PATENT DOCUMENTS

| | | | |
|---|---|---|---|
| 2,953,351 A * | 9/1960 | Bodine | E21B 7/24 175/320 |
| 3,099,918 A * | 8/1963 | Garrett | E21B 17/07 464/89 |
| 3,121,347 A | 2/1964 | Rumsey | |
| 3,323,326 A * | 6/1967 | Vertson | E21B 17/07 175/323 |
| 3,552,230 A | 1/1971 | Mclean | |
| 3,610,347 A * | 10/1971 | Diamantides | E21B 7/24 175/56 |
| 3,848,931 A | 11/1974 | Swisher | |
| 4,428,443 A * | 1/1984 | Oliphant | E21B 17/07 175/321 |
| 4,502,552 A | 3/1985 | Martini | |
| 4,522,271 A | 6/1985 | Bodine et al. | |
| 4,593,889 A | 6/1986 | Odobasic | |
| 4,619,334 A | 10/1986 | Gustafsson | |
| 5,372,548 A | 12/1994 | Wohlfeld | |
| 5,743,362 A | 4/1998 | Clinard et al. | |
| 6,098,726 A | 8/2000 | Taylor et al. | |
| 6,158,529 A | 12/2000 | Dorel | |
| 6,327,539 B1 | 12/2001 | Keultjes et al. | |
| 6,758,921 B1 | 7/2004 | Streubel et al. | |
| 6,808,455 B1 | 10/2004 | Solorenko et al. | |
| 7,036,612 B1 | 5/2006 | Raymond et al. | |
| 7,219,752 B2 | 5/2007 | Wassell et al. | |
| 7,779,933 B2 | 8/2010 | Sihler et al. | |
| 8,214,188 B2 | 7/2012 | Bailey et al. | |
| 8,453,764 B2 | 6/2013 | Turner et al. | |
| 8,798,978 B2 | 8/2014 | Ertas et al. | |
| 8,950,512 B2 | 2/2015 | Nessjoen et al. | |
| 8,977,523 B2 | 3/2015 | Ertas et al. | |
| 9,004,195 B2 | 4/2015 | Regener et al. | |
| 9,109,410 B2 | 8/2015 | Swietlik et al. | |
| 9,249,632 B2 | 2/2016 | Lakkashetti et al. | |
| 9,382,761 B2 | 7/2016 | Huang et al. | |
| 9,458,679 B2 | 10/2016 | Turner et al. | |
| 9,476,261 B2 | 10/2016 | Venugopal et al. | |
| 9,581,008 B2 | 2/2017 | Kyllingstad | |
| 9,677,347 B2 * | 6/2017 | Ash | F16F 1/3732 |
| 9,976,405 B2 | 5/2018 | Hohl et al. | |
| 10,782,197 B2 | 9/2020 | Wu et al. | |
| 2003/0062170 A1 | 4/2003 | Slack | |
| 2004/0028490 A1 | 2/2004 | Bergholt et al. | |
| 2004/0238219 A1 | 12/2004 | Nichols et al. | |
| 2005/0145417 A1 | 7/2005 | Radford et al. | |
| 2006/0124354 A1 | 6/2006 | Witte | |
| 2006/0278442 A1 | 12/2006 | Kristensen | |
| 2007/0289778 A1 | 12/2007 | Watkins | |
| 2008/0060849 A1 | 3/2008 | Entchev et al. | |
| 2009/0044977 A1 | 2/2009 | Johnson et al. | |
| 2010/0025118 A1 | 2/2010 | Hampson et al. | |
| 2010/0139977 A1 | 6/2010 | Watkins et al. | |
| 2011/0077924 A1 | 5/2011 | Ertas et al. | |
| 2011/0120772 A1 | 5/2011 | McLoughlin et al. | |
| 2011/0198126 A1 | 8/2011 | Swietlik et al. | |
| 2011/0245980 A1 | 10/2011 | Nessjoen et al. | |
| 2012/0130693 A1 | 5/2012 | Ertas et al. | |
| 2012/0228028 A1 | 9/2012 | Turner et al. | |
| 2013/0092439 A1 | 4/2013 | Mauldin et al. | |
| 2014/0151122 A1 | 6/2014 | Venugopal et al. | |
| 2014/0166309 A1 | 6/2014 | Benedict et al. | |
| 2014/0284105 A1 | 9/2014 | Veltman | |
| 2014/0305660 A1 | 10/2014 | Ash et al. | |
| 2014/0318865 A1 | 10/2014 | Doris | |
| 2014/0323231 A1 | 10/2014 | Perry | |
| 2015/0050083 A1 | 2/2015 | Funderud et al. | |
| 2015/0053484 A1 | 2/2015 | Meister et al. | |
| 2015/0083493 A1 | 3/2015 | Wassell | |
| 2015/0122547 A1 | 5/2015 | Hohl et al. | |
| 2015/0259989 A1 | 9/2015 | Gajji et al. | |
| 2016/0002985 A1 | 1/2016 | Baudoin | |
| 2016/0138382 A1 | 5/2016 | Badkoubeh et al. | |
| 2016/0281488 A1 | 9/2016 | Dwars et al. | |
| 2016/0305197 A1 | 10/2016 | Gajji et al. | |
| 2016/0356089 A1 | 12/2016 | Nanayakkara et al. | |
| 2017/0030149 A1 | 2/2017 | Kadam et al. | |
| 2017/0089149 A1 | 3/2017 | Yao et al. | |
| 2017/0198840 A1 | 7/2017 | Gabdullin | |
| 2017/0328142 A1 | 11/2017 | Pratt et al. | |
| 2017/0343046 A1 | 11/2017 | Park et al. | |
| 2018/0100357 A1 | 4/2018 | Christopher et al. | |
| 2018/0252054 A1 | 9/2018 | Stokes | |
| 2018/0371889 A1 | 12/2018 | Hohl et al. | |
| 2019/0284881 A1 | 9/2019 | Hohl et al. | |
| 2019/0284882 A1 | 9/2019 | Peters | |
| 2020/0018124 A1 | 1/2020 | Hohl | |
| 2020/0018377 A1 | 1/2020 | Hohl et al. | |
| 2021/0010332 A1 | 1/2021 | Benedict et al. | |
| 2021/0079737 A1 | 3/2021 | Peters | |
| 2021/0079738 A1 | 3/2021 | Peters et al. | |
| 2021/0079976 A1 | 3/2021 | Hohl et al. | |
| 2021/0207469 A1 | 7/2021 | Nash et al. | |

FOREIGN PATENT DOCUMENTS

| | | |
|---|---|---|
| WO | 2005047640 A2 | 5/2005 |
| WO | 20160007689 A1 | 1/2016 |

OTHER PUBLICATIONS

Damptech, "21-001 B comparison between different dampers: Rotational friction damper compared to other dampers", 2017, 4 pages.

Fitzgerald, T.F., Anagnos, T., Goodson, M. and Zsutty, T., (1989) "Slotted bolted connections in aseismic design of concentrically braced connections." Earthquake Spectra, 5(2), 383-391.

Grigorian, C. E., Popov, E. P., "Energy Dissipation with Slotted Bolted Connections", Earthquake Engineering Research Center, College of Engineering, University of California at Berkley, Feb. 1994, 255 pages.

Grigorian, C.E. and Popov, E.P. (1993), "Slotted bolted connections for energy dissipation." Proc. ATC-17-1 Seminar on Seismic Isolation, Passive Energy Dissipation, and Active Control, San Francisco, March, 14 pages.

(56) References Cited

OTHER PUBLICATIONS

Hohl, et al.; "Prediction and Mitigation of Torsional Vibrations in Drilling Systems"; IADC/SPE-178874-MS; Mar. 2016, IADC/SPE Drilling Conference and Exhibition; 15 pages.

Hohl, et al; "Derivation and Experimental Validation of an Analytical Criterion for the Identification of Self-Excited Modes in Drilling System"; Journal of Sound and Vibration 342; 2015; 13 pages.

International Search Report and Written Opinion for International Application No. PCT/US2019/022198; International Filing Date Mar. 14, 2019; Report Mail Date Jul. 2, 2019 (pp. 1-10).

International Search Report and Written Opinion for International Application No. PCT/US2020/050419; International Filing Date Sep. 11, 2020; Report Mail Date Dec. 15, 2020 (pp. 1-10).

International Search Report and Written Opinion for International Application No. PCT/US2020/050425; International Filing Date Sep. 11, 2020; Report dated Dec. 21, 2020 (pp. 1-10).

International Search Report and Written Opinion for International Application No. PCT/US2020/050430; International Filing Date Sep. 11, 2020; Report dated Dec. 18, 2020 (pp. 1-8).

International Search Report and Written Opinion for International Application No. PCT/US2020/050475; International Filing Date Sep. 11, 2020; Report dated Dec. 23, 2020 (pp. 1-8).

International Search Report and Written Opinion for International Application No. PCT/US2019/022196; International Filing Date Mar. 14, 2019; Report dated Jul. 2, 2019 (pp. 1-11).

International Search Report and Written Opinion for International Application No. PCT/US2020/049019; International Filing Date Sep. 2, 2020; Report dated Dec. 8, 2020 (pp. 1-12).

Oueslati, et al.; "New Insights Into Drilling Dynamics Through High-Frequency Vibration Measurement and Modeling"; SPE 166212; 2013; Society of Petroleum Engineers; 15 pages.

\* cited by examiner

US 11,603,714 B2

VIBRATION ISOLATING COUPLER FOR REDUCING VIBRATIONS IN A DRILL STRING

CROSS REFERENCE TO RELATED APPLICATION

This application claims the benefit of U.S. Provisional Application Ser. No. 62/899,354, filed Sep. 12, 2019, U.S. Provisional Application Ser. No. 62/899,291, filed Sep. 12, 2019, U.S. Provisional Application Ser. No. 62/899,331, filed Sep. 12, 2019, and U.S. Provisional Application Ser. No. 62/899,332, filed Sep. 12, 2019, the entire disclosures of which are incorporated herein by reference.

BACKGROUND

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation (e.g., a compartment) located below the earth's surface. Different types of tools and instruments may be disposed in the boreholes to perform various tasks and measurements.

In operation, the downhole components may be subject to vibrations that can impact operational efficiencies. For example, severe vibrations in drill strings and bottom hole assemblies can be caused by cutting forces at the bit or mass imbalances in downhole tools such as mud motors. Vibrations may take the form of stick/slip vibrations and high frequency torsional oscillations (HFTO). HFTO vibrations typically occur at frequencies above 50 Hz and may be localized to a small portion of the drill string. Typically, HFTO have high amplitudes at the bit. Impacts from such vibrations can include, but are not limited to, reduced rate of penetration, reduced quality of measurements, and excess fatigue and wear on downhole components, tools, and/or devices.

SUMMARY

Disclosed is a vibration isolating coupler for reducing high frequency torsional oscillations in a drill string including a first coupler portion including an external surface and an internal surface, a second coupler portion including an external surface and an internal surface portion, and a vibration isolating portion extending between the first coupler portion and the second coupler portion. The vibration isolating portion including a first solid annular portion defining a first terminal end of the vibration isolating portion and a second solid annular portion defining a second terminal end of the vibration isolating portion. The vibration isolating portion including a plurality of slots extending from the first solid annular portion toward the second solid annular portion forming a plurality of vibration isolating elements. Each of the plurality of vibration isolating elements is disconnected from adjacent ones of the plurality of vibration isolating elements by a corresponding one of the plurality of slots. The plurality of vibration isolating elements enabling torsional rotation of the first coupler portion relative to the second coupler portion.

Also disclosed is a method of isolating high frequency torsional vibrations from one portion of a drill string connected to another portion of the drill string through a vibration isolating coupler having a first coupler portion connected to a second coupler portion through a vibration isolating portion having a plurality of slots defining a plurality of vibration isolating elements. The method includes introducing a torsional vibration into the first coupler portion, and isolating the torsional vibration from the second coupler portion by torsional oscillation of the vibration isolating portion.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
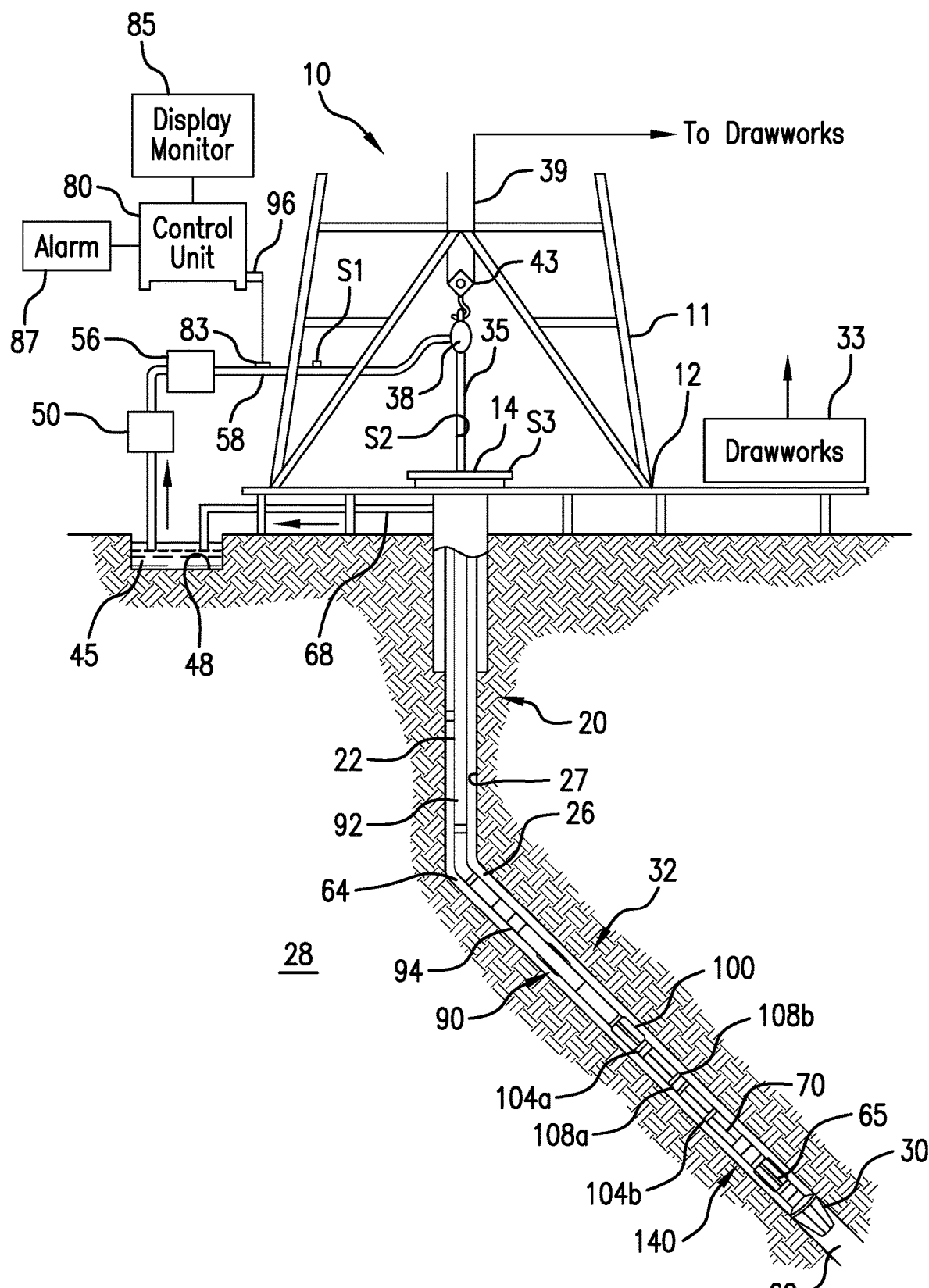
FIG. 1 depicts a resource exploration and recovery system including a vibration isolating coupler, in accordance with an aspect of an exemplary embodiment.

FIG. 1 shows a schematic diagram of a resource exploration and recovery system for performing downhole operations. The resource exploration and recovery system includes a downhole assembly. As shown, the resource exploration and recovery system takes the form of a drilling system 10. Drilling system 10 includes a conventional derrick 11 erected on a floor 12 that supports a rotary table 14 that is rotated by a prime mover, such as an electric motor (not shown), at a desired rotational speed. The downhole assembly in FIG. 1 takes the form of a drill string 20 that extends through rotary table 14 and includes a drilling tubular 22, such as a drill pipe into a borehole 26 having an annular wall 27 extending into a geological formation 28. The drill string may be a directional drill string, including a deflection device, a drilling motor, and/or a steering unit 65.

A disintegrating tool 30, such as a drill bit attached to the end of drill string 20 forms part of a bottom hole assembly (BHA) 32. Disintegrating tool 30 is operated to disintegrate portions of geological formation 28 thereby forming borehole 26. Drill string 20 is coupled to surface equipment such as systems for lifting, rotating, and/or pushing, including, but not limited to, a drawworks 33 via a kelly joint 35, swivel 38 and line 39 through a pulley 43. In some embodiments, the surface equipment may include a top drive (not shown). During the drilling operations, the drawworks 33 is operated to control the weight on bit, which affects the rate of penetration of disintegrating tool 30. The operation of the drawworks 33 is well known in the art and is thus not described in detail herein.

During drilling operations, a suitable drilling fluid 45 (also referred to as the "mud") from a source or mud pit 48 is circulated under pressure through an inner bore of the drill string 20 by a mud pump 50. Drilling fluid 45 passes into drill string 20 via a desurger 56, fluid line 58 and kelly joint 35. Drilling fluid 45 is discharged at a bottom 60 of borehole 26 through an opening (not shown) in disintegrating tool 30. Drilling fluid 45 circulates uphole through an annular space 64 between the drill string 20 and annular wall 27 (borehole wall) of borehole 26 and returns to mud pit 48 via a return line 68. A sensor S1 in the fluid line 58 provides information about the fluid flow rate. A surface torque sensor S2 and a sensor S3 associated with drill string 20 respectively provide information about the torque and the rotational speed of drilling tubular 22. Additionally, one or more sensors (not shown) associated with line 39 are used to provide hook load data of drill string 20 as well as other desired parameters relating to the drilling of borehole 26. Drilling system 10 may further include one or more downhole sensors 70 located on the drill string 20 and/or the BHA 32.

In some applications the disintegrating tool 30 is rotated by rotating drilling tubular 22. However, in other applications, a drilling motor (not shown) such as, a mud motor may form part of BHA 32 and may be operated to rotate disintegrating tool 30 and/or to superimpose or supplement the rotation of the drill string 20. In either case, the rate of penetration (ROP) of the disintegrating tool 30 into geological formation 28 for a given formation and a given drilling assembly largely depends upon the weight on bit and drill bit rotational speed.

A surface control unit 80 receives signals from downhole sensors 70 and devices via a transducer 83, such as a pressure transducer, placed in the fluid line 58 as well as from sensors S1, S2, S3, hook load sensors, RPM sensors, torque sensors, and any other sensors. Surface control unit 80 processes such signals according to programmed instructions. Surface control unit 80 may display desired drilling parameters and other information on a display/monitor 85 for use by an operator at the rig site to control drilling operations. Surface control unit 80 contains a computer, memory for storing data, computer programs, models and algorithms accessible to a processor in the computer, a recorder, such as tape unit, memory unit, etc. for recording data and other peripherals. Surface control unit 80 may also include simulation models for use by the computer to processes data according to programmed instructions. Surface control unit 80 may respond to user commands entered through a suitable device, such as a keyboard. Surface control unit 80 is adapted to activate alarms 87 when certain unsafe or undesirable operating conditions occur.

BHA 32 also contains other sensors and devices or tools for providing a variety of measurements relating to geological formation 28 and for drilling borehole 26 along a desired path. Such devices may include a device for measuring formation resistivity near and/or in front of disintegrating tool 30, a gamma ray device for measuring the formation gamma ray intensity and devices for determining the inclination, azimuth and position of drilling tubular 22. Other devices, such as logging-while-drilling (LWD) devices indicated generally at 90 such as devices for measuring formation porosity, permeability, density, rock properties, fluid properties, etc. may be placed at suitable locations in BHA 32 for providing information useful for evaluating geological formation 28 borehole 26. Such devices may include, but are not limited to, temperature measurement tools, pressure measurement tools, borehole diameter measuring tools (e.g., a caliper), acoustic tools, nuclear tools, nuclear magnetic resonance tools and formation testing and sampling tools. Further measurement-while-drilling (MWD) tools (not shown) may include directional and dynamics measuring tools that measure magnetic fields, acceleration, loads, as well as derived properties such as inclination, azimuth, rotational speed and the like may also be employed.

The above-noted devices transmit data to a downhole telemetry system 92, which in turn transmits the received data uphole to the surface control unit 80. Downhole telemetry system 92 also receives signals and data from the surface control unit 80 and transmits such received signals and data to appropriate downhole devices. In one aspect, a mud pulse telemetry system may be used to communicate data between downhole sensors, indicated generally at 94 arranged on drill string 20 and devices and the surface equipment during drilling operations. Transducer 83 placed in the fluid line 58 (e.g., mud supply line) detects the mud pulses responsive to the data transmitted by the downhole telemetry system 92. Transducer 83 generates electrical signals in response to the mud pressure variations and transmits such signals via a conductor 96 to surface control unit 80.

In other aspects, any other suitable telemetry system may be used for two-way data communication (e.g., downlink and uplink) between the surface and the BHA 32, including but not limited to, an acoustic telemetry system, an electromagnetic telemetry system, an optical telemetry system, a wired pipe telemetry system which may utilize wireless couplers or repeaters in the drill string or the borehole. The wired pipe telemetry system may be made up by joining drill pipe sections, wherein each pipe section includes a data communication link, such as a wire, that runs along the pipe. The data connection between the pipe sections may be made by any suitable method, including but not limited to, hard electrical or optical connections, induction, capacitive, resonant coupling, such as electromagnetic resonant coupling, or direct coupling methods. In case a coiled-tubing is used as the drilling tubular 22, the data communication link may be run along a side of the coiled-tubing.

Drilling system 10 relates to those drilling systems that utilize a drill pipe to convey the BHA 32 into borehole 26, wherein the weight on bit is controlled from the surface, typically by controlling the operation of drawworks 33. However, a large number of the current drilling systems, especially for drilling highly deviated and horizontal boreholes, utilize coiled-tubing for conveying the drilling assembly downhole. In such application a thruster (not separately labeled) may be deployed in drill string 20 to provide the desired force on disintegrating tool 30. Also, when coiled-tubing is utilized, the tubing is not rotated by a rotary table but instead it is injected into the borehole by a suitable injector while a downhole motor, such as a drilling motor (not shown), rotates the disintegrating tool 30. For offshore drilling, an offshore rig or a vessel may be used to support the drilling equipment, including the drill string.

Still referring to FIG. 1, a resistivity tool 100 may be provided that includes, for example, a plurality of antennas including, for example, transmitters 104a or 104b and/or receivers 108a or 108b. Resistivity can be one formation property that is of interest in making drilling decisions. Those of skill in the art will appreciate that other formation property tools can be employed with or in place of the resistivity tool 100.

Liner drilling can be one configuration or operation that is becoming more and more attractive in the oil and gas industry as it has several advantages compared to conventional drilling. One example of such configuration is shown and described in commonly owned U.S. Pat. No. 9,004,195, entitled "Apparatus and Method for Drilling a Borehole, Setting a Liner and Cementing the Borehole During a Single Trip," which is incorporated herein by reference in its entirety. Importantly, despite a relatively low rate of penetration, the time needed to position a liner to a target depth is reduced because the liner is run in-hole while simultaneously drilling the borehole. This may be beneficial in swelling formations where a contraction of the drilled well can hinder an installation of the liner later on. Furthermore, drilling with liner in depleted and unstable reservoirs minimizes the risk that the pipe or drill string will get stuck due to hole collapse.

Although FIG. 1 is shown and described with respect to a drilling operation, those of skill in the art will appreciate that similar configurations, albeit with different components, can be used for performing different downhole operations. For example, completion, wireline, wired pipe, liner drilling, reaming, coiled tubing, re-entry and/or other configurations can be used as known in the art. Further, production configurations can be employed for extracting and/or injecting materials from/into earth formations. Thus, the present disclosure is not to be limited to drilling operations but can be employed for any appropriate or desired downhole operation(s).

Severe vibrations in drill strings and bottom hole assemblies during drilling operations can be caused by cutting forces at the disintegrating tool 30 or mass imbalances in downhole tools such as drilling motors. Such vibrations can result in reduced rate of penetration, reduced quality of the borehole, reduced quality of measurements made by tools of the bottom hole assembly, and can result in wear, fatigue, and/or failure of downhole components. As appreciated by those of skill in the art, different vibrations exist, such as lateral vibrations, axial vibrations, and torsional vibrations. For example, stick/slip of the whole drilling system and high-frequency torsional oscillations ("HFTO") are both types of torsional vibrations. The terms "vibration," "oscillation," as well as "fluctuation," are used with the same broad meaning of repeated and/or periodic movements or periodic deviations of a mean value, such as a mean position, a mean velocity, and a mean acceleration. In particular, these terms are not meant to be limited to harmonic deviations, but may include all kinds of deviations, such as, but not limited to periodic, harmonic, and statistical deviations.

Torsional vibrations may be excited by self-excitation mechanisms that occur due to the interaction of the drill disintegrating tool 30 or any other cutting structure such as a reamer bit and the formation. The main differentiator between stick/slip and HFTO is the frequency and typical mode shapes: For example, HFTO have a frequency that is typically above 50 Hz compared to stick/slip torsional vibrations that typically have frequencies below 1 Hz. Typically, HFTO of particular interest may lie in a range between of 50 Hz and 500 Hz. These HFTO modes are referred to as critical HFTO or critical HFTO modes. A criterion to identify critical HFTO modes is described in Andreas Hohl et al., Journal of Sound and Vibration 342 (2015), 290-302. Moreover, the excited mode shape of stick/slip is typically a first mode shape of the whole drilling system whereas the mode shape of HFTO can be of higher order and are commonly localized to smaller portions of the drilling system with comparably high amplitudes at the point of excitation that may be the disintegrating tool 30 or any other cutting structure (such as a reamer bit), or any contact between the drilling system and the formation (e.g., by a stabilizer).

Due to the high frequency of the vibrations, HFTO correspond to high acceleration and torque values along the BHA or at only portions of the BHA. Those skilled in the art will appreciate that for torsional movements, one of acceleration, force, and torque is always accompanied by the other two of acceleration, force, and torque. In that sense, acceleration, force, and torque are equivalent in the sense that none of these can occur without the other two. The loads of high frequency vibrations can have negative impacts on efficiency, reliability, and/or durability of electronic and mechanical parts of the BHA. Embodiments provided herein are directed to providing a vibration isolating coupler 140 to mitigate HFTO. Vibration isolating coupler 140 is a modular tool that can be installed at various positions above, below, or within BHA 32.

For example, vibration isolating coupler 140 can be installed above disintegrating tool 30. In a directional drill string (directional BHA) a steering unit 65 may be located above disintegrating tool 30. In an embodiment, a stabilizer (stabilizer sub) may be placed above and/or below vibration isolating coupler 140. The stabilizers above and/or below the vibration isolating coupler centralize the vibration isolating coupler in the borehole and prevent the surface of the vibration isolating coupler from contacting annular wall 27. Steering unit 65 is located close to disintegrating tool 30 in order to adjust the drilling direction. In an embodiment, vibration isolating coupler 140 is arranged uphole of steering unit 65. Above vibration isolating coupler there may be one or more formation evaluation (FE) tools.

The disintegrating tool 30 is a point of excitation for HFTO. Without the vibration isolating coupler in the BHA, HFTO would excite HFTO along the whole BHA above desired thresholds. Vibration isolating coupler 140 isolates the portion of the BHA above the vibration isolating coupler 140 from propagation of HFTO excited in the portion of the BHA below the vibration isolating coupler. Vibration isolating coupler 140 restricts the HFTO excited by the cutting forces at disintegrating tool 30 to the BHA below the vibration isolating coupler 140. Due to the design of vibration isolation coupler 140, torsional dynamics of the BHA are modified to allow selected HFTO mode shapes to have selected amplitude only in the portion of the BHA below vibration isolating coupler 140. Vibration isolating coupler 140 in the BHA allows the portion of the BHA below the vibration isolating coupler 140 to oscillate (HFTO) by isolating the oscillation from the portion of the BHA above the vibration isolating coupler. Also, the vibration isolating coupler changes the number of excited HFTO modes. In a BHA with vibration isolating coupler a smaller number of HFTO modes are excited.

Vibration isolating coupler 140 acts as a mechanical low-pass filter for HFTO and includes an isolating frequency (natural frequency or first resonance frequency). The isolating effect of vibration isolating coupler 140 results from a significantly smaller isolating frequency of the vibration isolating coupler compared to the HFTO frequencies excited at the disintegrating device 30 or at any other cutting structure in the BHA. The smaller isolating frequency can be achieved by using vibration isolating coupler 140 with a sufficiently small torsional stiffness. The small torsional stiffness of vibration isolating coupler 140 isolates the mass located below the vibration isolating coupler 140 from the mass above the vibration isolating coupler 140 in the torsional degree of freedom for frequencies above the isolating frequency. HFTO modes excited at disintegrating tool 30 with frequencies above the isolating frequency are isolated from the portion of the BHA above vibration isolating coupler 140. A suitable isolating frequency for a vibration isolating coupler in a downhole assembly is, in one embodiment, between 10 Hz and 100 Hz. Alternatively, in another embodiment, the isolating frequency may be between 10 Hz and 70 Hz. In yet another embodiment, the isolating frequency (first natural frequency or first resonant frequency) may be between 20 Hz and 50 Hz. Simulations have shown that an isolating frequency of 30 Hz achieves desirable isolation of HFTO modes. The isolating frequency of vibration isolating coupler 140 depends on the torsional spring constant (or torsional stiffness) of portions of vibration isolating coupler 140 and the oscillating mass below the vibration isolating coupler 140. The term small torsional stiffness refers to a ratio between bending stiffness and torsional stiffness (bending stiffness/torsional stiffness, (BST/TST)) bigger than 10, bigger than 15, bigger than 20, bigger than 30, bigger than 40, bigger than 50.

In an embodiment, locating vibration isolating coupler 140 above the steering unit 65 and the drill disintegrating tool 30 3 provides a sufficient high oscillating mass that achieves an isolating frequency of around 30 Hz. Smaller masses, e.g. only the disintegrating tool 30, lead to isolating frequencies higher than 30 Hz, e.g. frequencies between about 150 Hz and about 200 Hz. BHA components located close to disintegrating tool 30 are designed to withstand high levels of vibrations (axial, lateral and torsional). An isolating frequency of 30 Hz limits the HFTO modes, the associated torque loads, and the angular acceleration loads acting on the steering unit 65 and disintegrating tool 30 to only a few selected HFTO modes. A higher isolating frequency would lead to more HFTO modes being excited in the portion of the BHA below vibration isolating coupler 140, potentially resulting in damage to steering unit 65 and/or the disintegrating tool 30. In this embodiment the lower part of the BHA (below the vibration isolating coupler 140) is decoupled (isolated) in terms of HFTO from the upper part of the BHA (above the vibration isolating coupler).

In alternative embodiments, HFTO modes may be excited in a portion of the BHA above the vibration isolating coupler (e.g. by a reamer). In such an example, vibration isolating coupler 140 isolates the portion of the BHA below the vibration isolating coupler from HFTO modes. In a BHA with a vibration isolating coupler as described herein, the HFTO mode shape amplitudes above vibration isolating coupler 140 (portion of the BHA with no HFTO excitation) are comparatively low to the HFTO mode shape amplitudes below the vibration isolating coupler 140 (portion of the BHA with HFTO excitation).

Figure 2A:
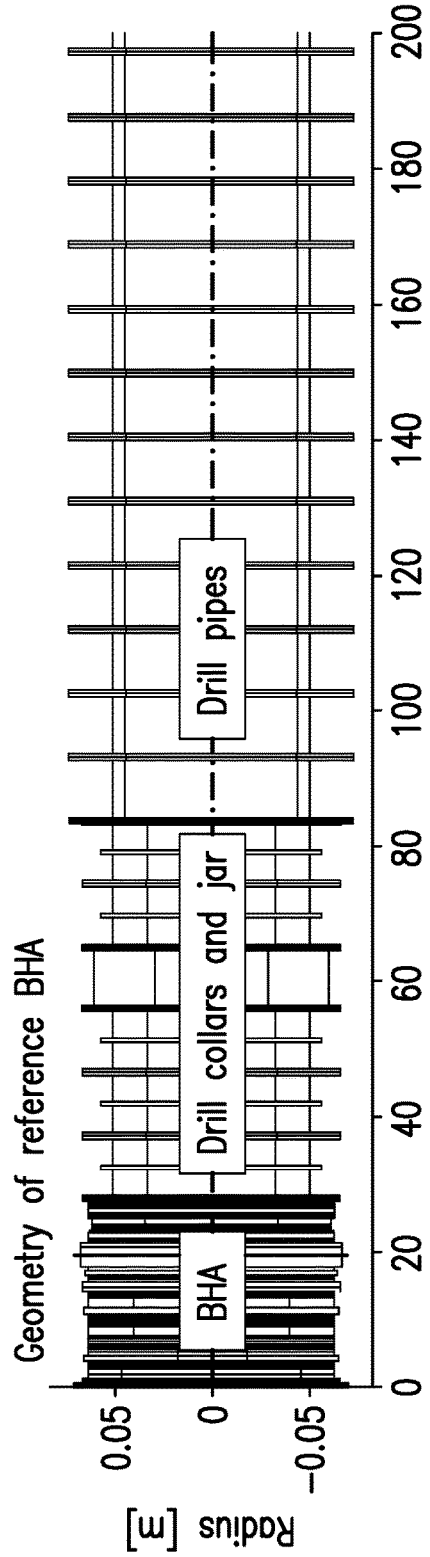
FIG. 2A depicts a bottom hole assembly (BHA) geometry without a vibration isolating coupler.
Figure 2B:
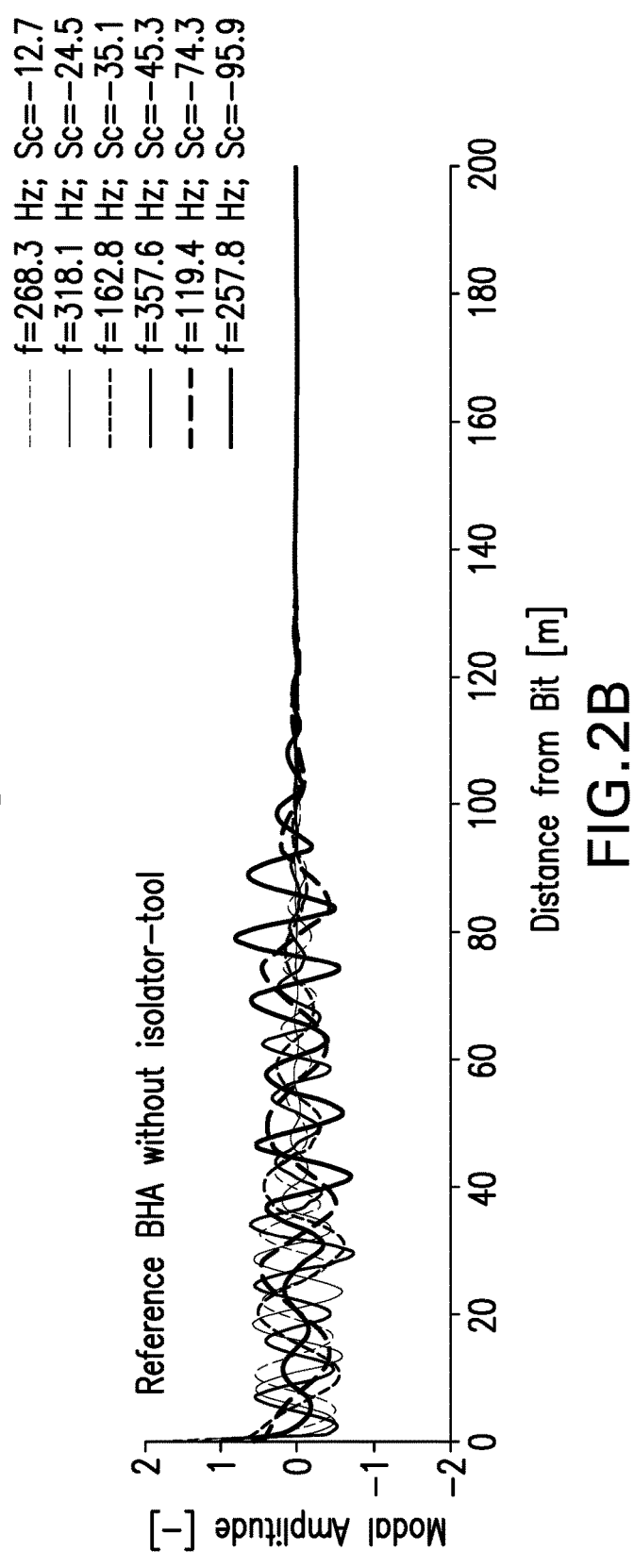
FIG. 2B depicts high frequency torsional oscillation (HFTO) modes without a vibration isolating coupler.

FIGS. 2A and 2B show a geometry of a reference BHA (4.75" tool size) in a drill string without a vibration isolating coupler and simulated six HFTO mode shapes with and corresponding frequencies (f) between 119.4 Hz and 357.6 Hz. The Parameter $S_c$ is an indicator for the likelihood of occurrence of a HFTO mode shape. The HFTO mode shape amplitudes indicate where torsional vibration energy is appearing in the BHA section of the drill string.

Figure 3A:
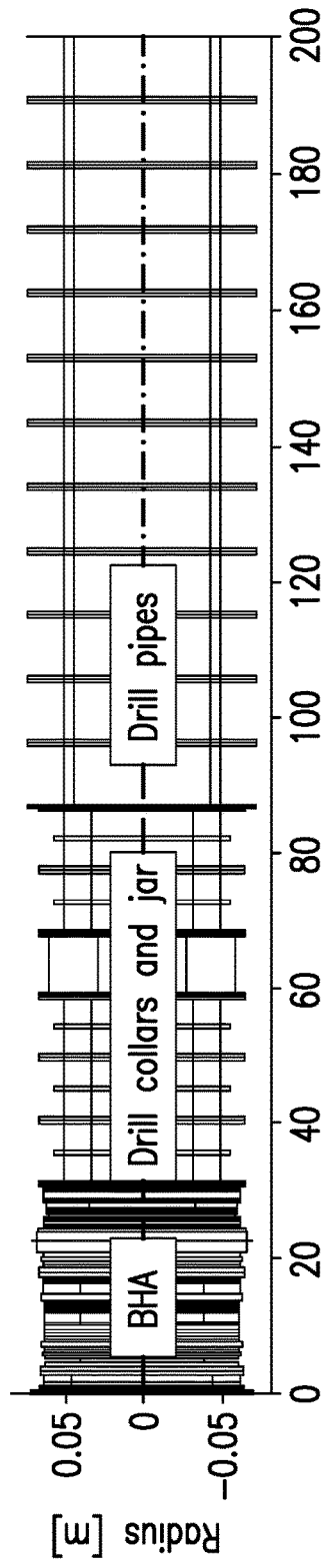
FIG. 3A depicts a BHA geometry with a vibration isolating coupler, in accordance with an exemplary aspect.
Figure 3B:
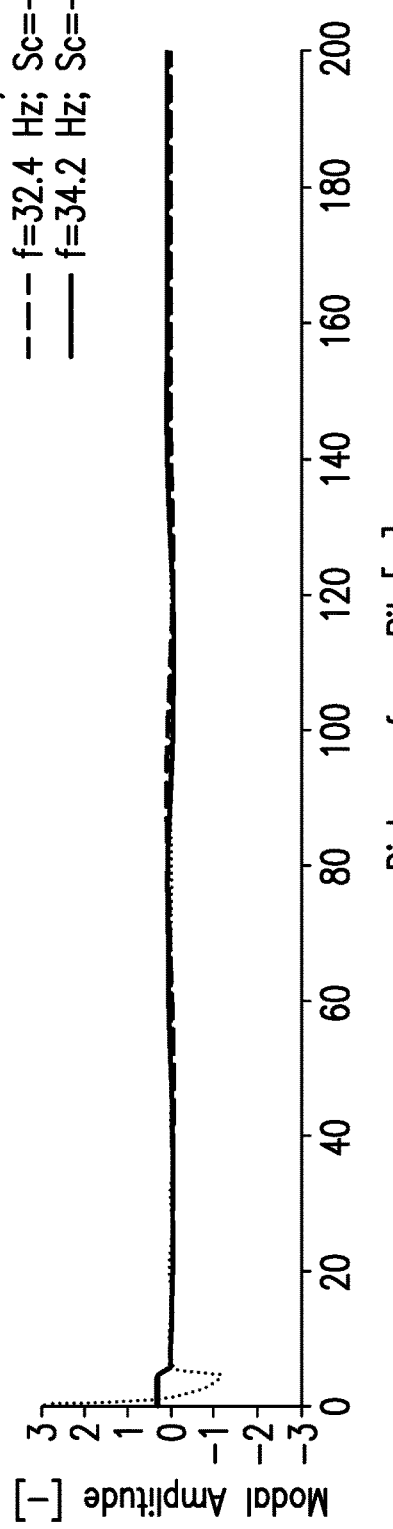
FIG. 3B depicts HFTO modes with a vibration isolating coupler, in accordance with an exemplary embodiment.

FIGS. 3A and 3B show the geometry of the reference BHA in the drill string with vibration isolating coupler 140 placed above the disintegrating tool 30 and steering unit 65. The addition of vibration isolating coupler 140 leads to reduced number of HFTO modes in a frequency range of 50 Hz to 500 Hz. There are also other modes at or near the isolating frequency of the vibration isolating coupler (30 Hz) that have a high likelihood of occurrence. However, these HFTO modes with small frequency/small amplitude do not have an impact similar to HFTO modes with higher frequencies/amplitudes appearing along the BHA in the reference BHA without a vibration isolating coupler (FIGS. 2A and 2B).

The simulation results depicted in FIGS. 2 and 3 show that HFTO are concentrated at the disintegrating tool 30 and steering unit 65. Above vibration isolating coupler 140 the HFTO mode shape amplitudes are significantly smaller compared to the amplitudes of the respective mode shape amplitudes below vibration isolating coupler 140. HFTO mode shapes that are existing in the upper part of the reference BHA (FIG. 2) without vibration isolating coupler 140 are either not excited in the BHA with vibration isolating coupler due to the changed torsional dynamics or appear with a significantly smaller HFTO mode shape amplitude. Consequently, FE tools or MWD tools including highly complex electronics (PCBAs, ceramic material including Multi-Chip Modules (MCMs)), sensors, connectors, wires, hydraulic devices, and/or mechanical devices located above vibration isolating coupler 140 are exposed to reduced torsional dynamic loads leading to higher quality of downhole measurement data (in particular imaging data) and increased downhole tool reliability.

In an embodiment, vibration isolating coupler 140 is formed to have a short a length, as possible in order to keep the FE tools close to the disintegrating tool 30. In one embodiment, vibration isolating coupler 140 as described herein may be shorter than 2 m. In another embodiment, vibration isolating coupler 140 may be shorter than 1.5 m. In yet another embodiment, vibration isolating coupler 140 may be, shorter than 1.2 m. In yet still another embodiment, vibration isolating coupler 140 may be, shorter than 1.1 m. In still yet another embodiment, vibration isolating coupler 140 may be shorter than 1 m. To achieve the isolating characteristic, vibration isolating coupler 140 includes a small rotational stiffness (torsional softness, small torsional stiffness) to isolate HFTO. At the same time vibration isolating coupler 140 includes a high bending stiffness to facilitate the steering behavior of a directional BHA, namely the steering unit.

Herein are presented different designs for vibration isolating coupler 140 in various embodiments that possess mechanical properties which balance torsional softness and bending stiffness while keeping the mechanical stresses below an acceptable limit. Mechanical stresses are caused by axial loads (weight on bit (WOB)), torque applied by surface equipment (drill string rotation), dynamic bending by borehole doglegs and vibration (lateral, axial, torsional). Vibration isolating coupler 140 may be formed integrally in only one piece or may be formed from a number of connected components.

A vibration isolation coupler integrally formed without connections (such as threads, welded connections or otherwise formed connections) is less prone to tool failures. Modern manufacturing methods, such as additive manufacturing provide opportunities to create a vibration isolating coupler formed as one integral part with a complex shape. The vibration isolating coupler as described herein does not include bearings or other parts rotating relative to each other. The lack of bearings leads to reduced wear. The vibration isolating coupler as described herein does not use friction surfaces or friction forces to dissipate rotational energy. Friction in this context includes viscous friction (viscous force). It is to be understood that vibration isolating coupler 140 only isolates rotation associated with torsional oscillations. Rotation (non-oscillating or continuous rotation) as applied by a rotary table or a top drive are transferred from the BHA above of the vibration isolating coupler 140 to the BHA below the vibration isolating coupler. Although vibration isolating coupler 140 isolates HFTO, the BHA above and below the vibration isolating coupler are rotationally coupled.

Referring to FIGS. 4-7, vibration isolating coupler 140 includes a first coupler portion 146 defining a first terminal end 147 and a second coupler portion 148 defining a second terminal end 149 joined by a vibration isolating portion 150. Vibration isolating portion 150 includes a first terminal end 151 and a second terminal end 152. First coupler portion 146 include an external surface and an internal surface (not separately labeled) that define a central passage 141. Second coupler portion 148 includes an external surface and an internal surface (also not separately labeled) defining a central passage 142. First coupler portion 146 and second coupler portion 148 include a connecting element (not separately labeled), such as a threaded section (not shown), that may be used to connect to adjacent tools. For example, first coupler portion 146 may take the form of a box connection and second coupler portion 148 may take the form of a pin connection. Vibration isolating coupler 140 extends along a longitudinal axis "L".

In an alternative embodiment, the pin connection may be included in the first coupler portion 146 and the box connection may be included in the second coupler portion 148. In an embodiment, vibration isolating coupler 140 is a modular tool that may be integrated in a modular BHA. As a consequence, vibration isolation coupler 140 also transfers data communication and power from the portion of the BHA above the vibration isolating coupler 140 to the portion of the BHA below and vice versa, through a power and communication bus, such as a power line bus system (not shown). The power and communication bus may include an electrical or optical connection that runs from first coupling portion 146 through the vibration isolating portion 140 to second coupling portion 148. The connection may be provided by an electrical (power, data) or optical (data) conductor or wire (also not shown).

First coupling portion 146 and second coupling portion 148 may include a connector (not shown) that interfaces with the power and communication bus system of the downhole component above and/or below vibration isolating coupler 140. The connector included in either first and/or second coupling portions 146/148 may take the form of a ring connector (not shown) or alternatively a central connector (also not shown) located in an inner bore (not separately labeled) of the downhole component and central passage 141 in first coupler portion 146 and central passage 142 in second coupler portion 148. The conductor or wire may pass through vibration isolating portion 150 via either a cavity or a passage, as described herein. In alternative embodiments other connector types may also be employed.

Figure 4:
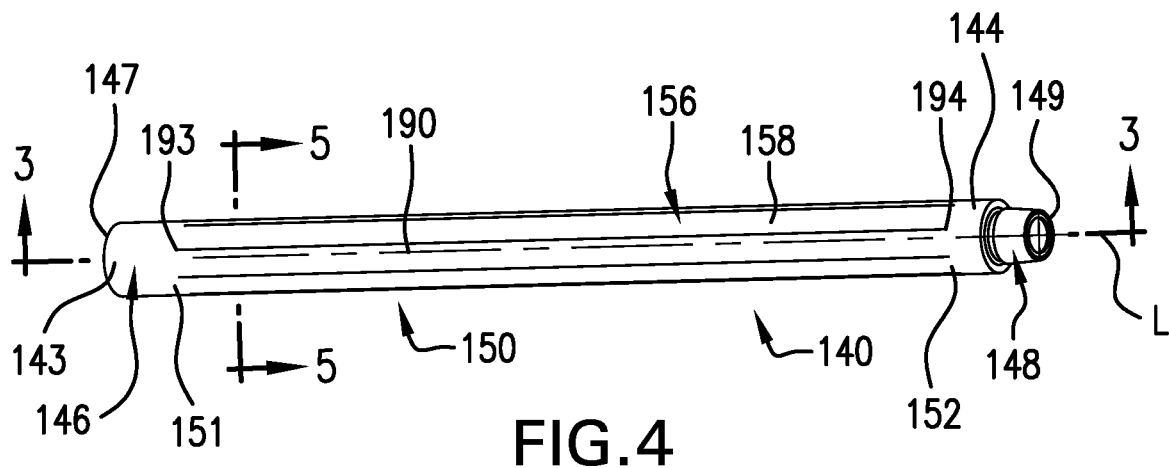
FIG. 4 depicts the vibration isolating coupler, in accordance with an aspect of an exemplary embodiment.
Figure 5:
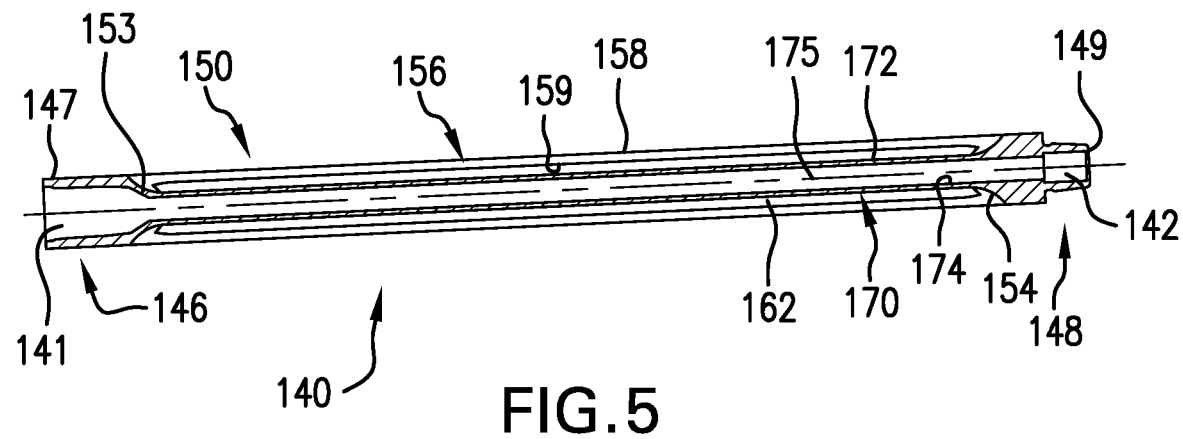
FIG. 5 depicts a cross-sectional view of the vibration isolating coupler of FIG. 4 taken along the line 3-3, in accordance with an aspect of an exemplary embodiment.
Figure 6:
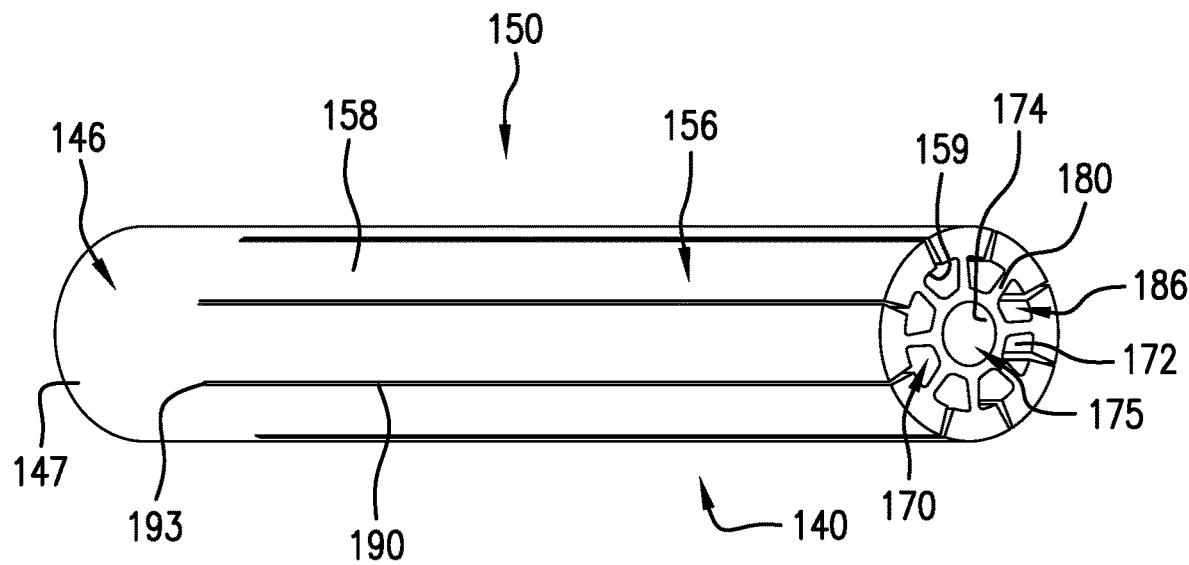
FIG. 6 depicts an isometric view of a portion of the vibration isolating coupler of FIG. 4, in accordance with an aspect of an exemplary embodiment.

In an embodiment, first coupler portion 146, second coupler portion 148, and vibration isolating portion 150 are integrally formed by for example using additive manufacturing technologies. In an alternative embodiment, first coupler portion 146 is connected to first terminal end 151 of vibration isolating portion 150 and second coupler portion 148 is connected to second terminal end 152 of vibration isolating portion 150 by welding (e.g. stub welding), or by other connecting means, including threads. Vibration isolating portion 150 includes a plurality of vibration isolating elements, one of which is indicated at 156. As shown in FIGS. 3-5, each of the vibration isolating elements 156 includes an external surface 158. Depending on the particular shape, the vibration isolating elements may also include an internal surface 159 that defines a chamber or cavity 186. A central support 170 passes through vibration isolating coupler 140 and joins first coupler portion 146 and second coupler portion 148. The chambers or cavities are located in an annular region surrounding central support 170. Central support 170 includes an external surface portion 172 and may include an internal surface portion 174 that defines a central passage portion 175.

In an embodiment, plurality of connecting elements 180 extend in radial direction R (FIG. 7) from external surface portion 172 of central support 170 and connects with a plurality of vibration isolating elements 156. The term radial relates to a direction perpendicular to the longitudinal axis L of vibration isolating coupler 140. The plurality of vibration isolating elements 156 forming a plurality of chambers or cavities 186. In an exemplary aspect, plurality of connecting elements 180 are integrally formed with central support 170 and corresponding ones of the plurality of vibration isolating elements 156. As will be detailed herein, cavities 186 may be employed to transfer fluid along drill string 20 or may be used as a path to run conductors (electrical, optical). Connecting elements 180, slots 190 and vibration isolating elements 156 extend along more than half of the length of the vibration isolating portion 150 from the first coupler portion 146 to the second coupler portion 148. Slots 190 terminate at a portion of the vibration isolating portion 150 that comprises a closed surface and a solid annular portion. The solid annular portion includes a first solid annular portion 143 and a second solid annular portion 144 located at opposing ends of vibration isolating portion 150. First solid annular portion 143 surrounds a central passage 141 and second solid annular portion 144 surrounds a central passage 142.

In accordance with an exemplary embodiment, vibration isolating portion 150 includes a plurality of slots or cuts 190 that separate and define the plurality of vibration isolating elements 156. Slots 190 extend between first coupler portion 146 and second coupler portion 148. Each of the plurality of slots 190 includes a first terminal end portion 193 and a second opposing terminal end portion 194. First terminal end portion 193 is spaced from first terminal end 147 defined by first coupler portion 146 and second terminal end portion 194 is spaced from second terminal end 149 defined by second coupler portion 148. First terminal end portion 193 is closer to first coupler portion 146 than to second coupler portion 148 and second terminal end portion 194 is closer to second coupler portion 148 than to first coupler portion 146.

First terminal end portion 193 terminates at first solid annular portion 143 and second terminal end portion 194 terminates at second solid annular end portion 144.

The slots or cuts 190 are substantially parallel to the longitudinal axis L of the vibration isolating coupler 140. Vibration isolating elements 156 extend along the length of the vibration isolating portion 150 from the first coupler portion 146 to the second coupler portion 148. Vibration isolating elements 156 extend in circumferential direction C (FIG. 7) (perpendicular to the longitudinal axis L) between neighboring (adjacent) slots 190. With this arrangement, it should be understood that plurality of slots 190 do not extend an entire length of vibration isolating portion 140. The number of slots may vary.

First terminal end portion 193 and second terminal end portion 194 of the plurality of slots 190 include a transition zone to solid annular portion of vibration isolating portion 150. First terminal end portion 193 includes a first transition zone 153 to first solid annular portion 143 and second terminal end portion 194 includes a second transition zone 154 to second solid annular portion 144. The first transition zone and the second transition zone each include a smooth transition to first and second solid annular portions 143 and 144. The smooth transition includes at least one radius. In embodiments the transition zone may include a three-center-curve or a basket arch. The plurality of vibration isolating elements 156 include a transition zone to the solid annular portion of vibration isolating portion 150. The transition zone from the plurality of vibration isolating elements 156 to the solid annular portion includes a smooth transition that include at least one radius, a three-center-curve, or a basket arch. The plurality of connection elements 180 include a transition zone to central support 170 of vibration isolating portion 150. The transition zone from the plurality of connecting elements 180 to central support 170 includes a smooth transition that include at least one radius, a three-center-curve, or a basket arch.

In accordance with an exemplary embodiment, a torsional input at first coupler portion 146 translates through vibration isolating portion 150 to second coupler portion 148. Plurality of slots 190 allow first coupler portion 146 to torsionally rotate relative to second coupler portion 148 around the longitudinal axis L of the vibration isolating coupler 140. The plurality of slots 190 allow the rotation around longitudinal axis L through elastic bending or deformation of the plurality of vibration isolating elements 156 and torsion of central support 170. The bending of the plurality of vibration isolating elements is a bending substantially perpendicular to the longitudinal axis L of the vibration isolating coupler 140. The plurality of slots decrease the torsional stiffness of the vibration isolating portion 150.

In an embodiment, first and second coupler portions 146 and 148, vibration isolating portion 150, including the central support, connecting elements 180 and the plurality of vibration isolating elements 156 are integrally formed. Torsional rotation of first coupler portion 146 relative to second coupler portion 148 and torsional rotation (oscillation) of vibration isolating portion 150 around the longitudinal axis L of vibration isolating coupler isolates HFTO, produced by disintegrating tool 30 below the vibration isolating coupler 140, from the portion of the BHA above the vibration isolating coupler 140. Disintegrating tool 30 is located below the vibration isolating coupler 140 and is closer to second coupler portion 148 than to first coupler portion 146. The torsional oscillation takes place at an excited HFTO frequency, excited at the disintegrating tool 30 by cutting forces. The amplitude of the torsional oscillation (perpendicular to the longitudinal axis L) decreases along the vibration isolating portion 150. In ideal case first coupler portion 146 does not oscillate any more. That is. HFTO is isolated from first coupler portion 146 by vibration isolating portion 150.

Isolation of torsional oscillation between second coupler portion 148 and first coupler portion 146 is achieved through torsional softness of vibration isolation portion 150 that allows second coupler portion 148 to rotate relative to first coupler portion 146. In embodiments the torsional input takes place at the first coupler portion 146. This may happen when the HFTO is produced closer to the first coupler portion 146 than to the second coupler portion 148. e.g. by a reamer that is located above the vibration isolating coupler 140. In an exemplary embodiment, disintegrating tool 30 is located downhole of the vibration isolating coupler 140. The first coupler portion 146 is located uphole and the second coupler portion 148 is located downhole. In an exemplary aspect, first coupler portion 146 represents the end of the vibration isolating coupler 140 that is located closer to the surface. The required torsional softness or flexibility of the vibration isolating portion 150 to achieve the desired isolation from HFTO of the portion of the BHA above the vibration isolating coupler is achieved by forming the vibration isolating portion 150 using an optimized topology.

Torsional stiffness is calculated by the equation:

$$T = G^* I_T$$

wherein T is the torsional stiffness, G is the shear modulus and $I_T$ is the torsional moment of inertia related to the axis of rotation (longitudinal axis L).

By using FE modeling, the shape of the central support 170, the connecting elements 180 and the vibration isolating elements 156 is adjusted to achieve a torsional moment of inertia $I_T$ that results in a small torsional stiffness T, while at the same time (i) preserving a required bending stiffness and (ii) not exceeding a desired axial length of the vibration isolating coupler 140 (typically 1 m). A small torsional moment of inertia IT leads to a small torsional stiffness T.

The extension of the vibration isolating elements 156 along the longitudinal axis L and the extension of the vibration isolating elements in circumferential direction C of the vibration isolating coupler 140 lead to a high bending stiffness.

In an embodiment, first coupling portion 146 and second coupling portion 148 may be formed from the same material as the vibration isolating portion 150. In another embodiment, first coupling portion 146 and second coupling portion 148 may be formed from different materials. Slots 190 operate to achieve a selected torsional softness by preserving bending stiffness. Bending stiffness is supported by an orientation of the slots 190 substantially parallel to the longitudinal axis L. The slots are oriented to achieve a rotational symmetric topology providing uniform bending stiffness in every bending orientation and avoiding warping distortion effects under torsional movements. The mass distribution of the vibration isolating portion 150 in circumferential direction is rotation symmetric, by rotation around the longitudinal axis L.

To achieve uniform bending a number of slots of 2, 3, 4, 5, 6, 7, 8, 9, 10 or bigger than 10 is used. Also, the shape of the vibration isolating elements 156 has to fulfill symmetry requirements to avoid unbalanced masses in the vibration isolation portion 150 with respect to rotation around the longitudinal axis L and to support its bending stiffness (mainly the circumferential extension of the vibration isolating elements 156). The width of the slots are adjusted to allow certain twisting angles α (FIG. 5) of the vibration isolating portion 150 before the slots close and impede further twisting.

Closing slots under torsional oscillation lead to locking of the vibration isolating portion 150. The selection of the width of the slots includes in the vibration isolating coupler a kind of end stop of the twisting angle a or torsional oscillation amplitude. The slots extend along the length of the vibration isolating portion 150 parallel to the longitudinal axis L and along at least 50%, 70%, 80%, 90%, 95%, or 99% of the total length of the vibration isolating coupler 140.

Figure 8:
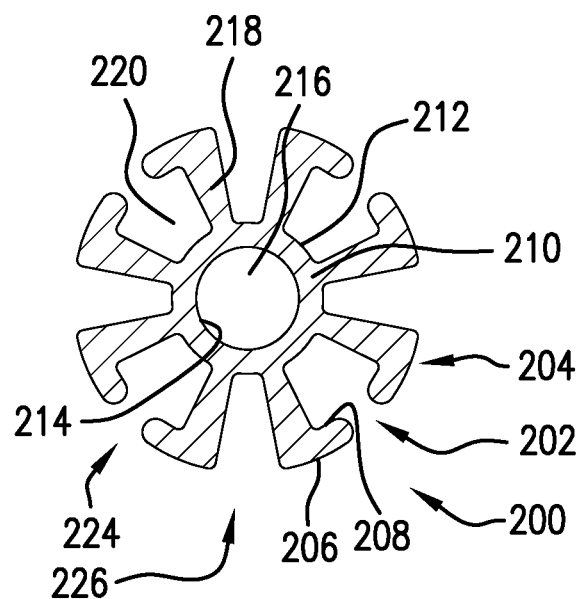
FIG. 8 depicts an axial end view of the portion of the vibration isolating coupler, in accordance with yet another aspect of an exemplary embodiment.

FIG. 8 depicts a vibration isolation coupler 200 in accordance with another aspect of an exemplary embodiment. Vibration isolating coupler 200 includes a vibration isolating portion 202 formed by a plurality of vibration isolating elements, one of which is indicated at 204. Each of the plurality of vibration isolating elements 204 includes an external surface 206 and an internal surface 208. Vibration isolating coupler 200 includes a central support 210 having an external surface portion 212 and may include an internal surface portion 214 that defines a central passage portion 216.

In an embodiment, vibration isolating portion 202 includes a plurality of connecting elements 218 that extend from external surface portion 212 of central support 210 and connects with corresponding ones of the plurality of vibration isolating elements 204. A circumferential extension (not separately labeled) of connecting element 218 is smaller than a circumferential extension (also not separately labeled) of vibration isolating element 204 leading to a plurality of chambers or cavities in an annular region of vibration isolating portion 202, one of which is indicated at 220. In an exemplary aspect, plurality of connecting elements 218 are integrally formed with central support 210 and corresponding ones of the plurality of vibration isolating elements 204.

In accordance with an exemplary embodiment, vibration isolating coupler 200 includes a first plurality of slots or cuts, one of which is indicated at 224 and a second plurality of slots or cuts, one of which is indicated at 226. First plurality of slots 224 include a first width and second plurality of slots 226 include a second width that is greater than the first width. It should be understood that first plurality of slots 224 and second plurality of slots 226 do not extend an entire length of vibration isolating portion 202.

In accordance with an exemplary embodiment, a torsional input at a first coupler portion (not shown) of vibration isolating coupler 200 translates to a second coupler portion (also not shown). Vibration isolating portion 202 allows the first coupler portion to torsionally rotate relative to the second coupler portion through elastic torsion of central support 210 and bending or deformation of the plurality of connecting elements 218. In an embodiment the first and second coupler portions together with each of the plurality of vibration isolating elements 204, connecting elements 218 and central support 210 are formed integrally. Torsional rotation of the first coupler portion relative to the second coupler portion facilitated by the torsional softness of vibration isolating portion 202 reduces HFTO produced by disintegrating tool 30.

Figure 9:
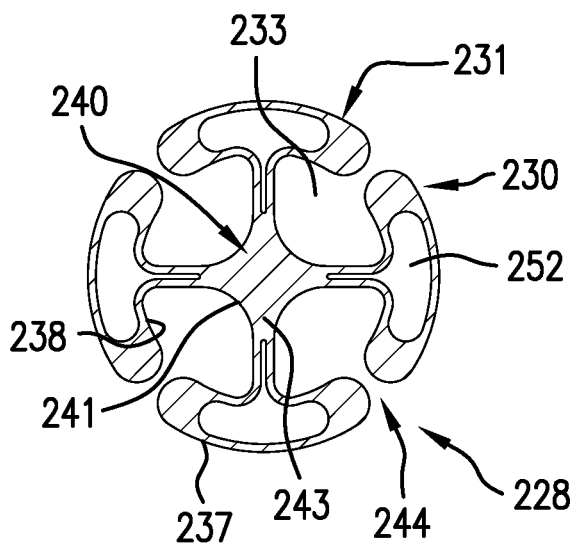
FIG. 9 depicts an axial end view of the portion of the vibration isolating coupler, in accordance with still yet another aspect of an exemplary embodiment.

FIG. 9 shows a vibration isolating coupler 228 in accordance with another aspect of an exemplary embodiment. Vibration isolating coupler 228 includes a vibration isolating portion 230 including a plurality of vibration isolating elements, one of which is indicated at 231. Each of the plurality of vibration isolating elements 231 includes an external surface 237 and an internal surface 238. A central support 240 extends through vibration isolating coupler 228 and includes an external surface portion 241 and a solid cross-section (not separately labeled). A solid central support positively affects the isolation efficiency of the isolator.

In an embodiment, a plurality of connecting elements, one of which is shown at 243 extend from external surface portion 241 of central support 240 and connects with corresponding ones of the plurality of vibration isolating elements 231 forming a plurality of annular chambers or cavities 233. In an exemplary aspect, plurality of connecting elements 243 may be integrally formed with central support 240 and corresponding ones of the plurality of vibration isolating elements 231. A circumferential extension (not separately labeled) of the connecting element 243 is smaller than a circumferential extension of vibration isolating elements 231 leading to a plurality of annular chambers or cavities 233 in an annular region of vibration isolating portion 228.

In accordance with an exemplary embodiment, vibration isolating portion 230 includes a plurality of slots or cuts 244 that separate and define the plurality of vibration isolating elements 231 and promote torsional rotation of vibration isolating coupler 228 in a manner similar to that discussed herein. It should be understood that the plurality of slots do not extend an entire length of vibration isolating portion 230.

In an embodiment, one or more of the plurality of vibration isolating elements 231 may include a passage 252. Passage 252 may extend into corresponding ones of the plurality of connecting elements 243. The number, geometry, and arrangement of passages 252 may vary. Passage(s) 252 facilitate fluid flow through vibration isolating coupler 228. Passage(s) 252 may also accommodate a conductor. The fluid may take the form of drilling mud that passes to disintegrating tool 30. The drilling mud may pass through a mud motor (not shown) to provide motive force to disintegrating tool 30. The conductor may pass data and power and control signals within the BHA from one downhole component to another downhole, component, for example, downhole/subsurface tools, devices, sensors and the like.

In a manner similar to that discussed herein, a torsional input at a first coupler portion (not shown) of vibration isolating coupler 228 translates to a second coupler portion (also not shown). The plurality of slots 244 allow the first coupler portion to torsionally rotate relative to the second coupler portion through elastic bending or deformation of plurality of connecting elements 243 and torsion of central support in a manner similar to that discussed herein. In an embodiment central support 240 together with plurality of vibration isolating elements 231 and connecting elements 243 are formed integrally. Torsional rotation of the first coupler portion relative to the second coupler portion facilitated by the torsional softness of vibration isolating portion 230 reduces HFTO produced by disintegrating tool 30.

Figure 10:
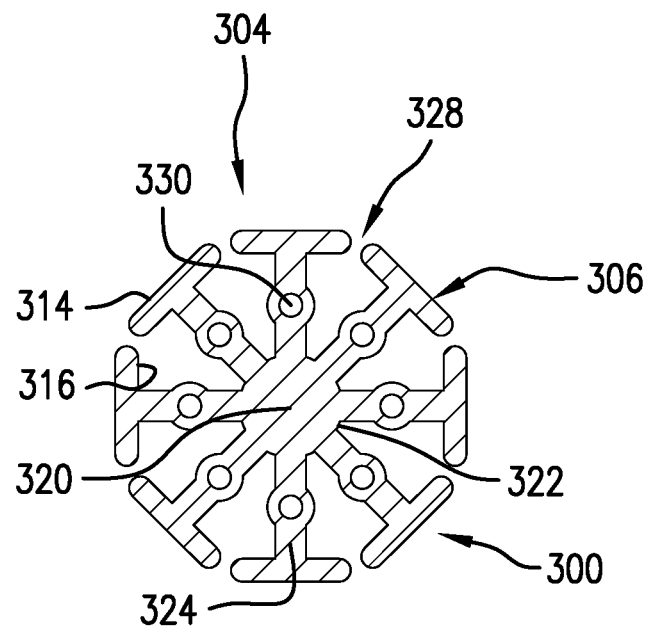
FIG. 10 depicts an axial end view of the portion of the vibration isolating coupler, in accordance with yet still another aspect of an exemplary embodiment.

FIG. 10 shows a vibration isolating coupler 300 in accordance with another aspect of an exemplary embodiment. Vibration isolating coupler 300 includes a vibration isolating portion 304 including a plurality of vibration isolating elements 306. Each of the plurality of vibration isolating elements 306 includes an external surface 314 and an internal surface 316. A central support 320 extends through vibration isolating coupler 300. Central support 320 includes an external surface portion 322 and a solid cross-section (not separately labeled).

In an embodiment, a plurality of connecting elements, one of which is shown at 324, extend from external surface portion 322 of central support 320 and connects with corresponding one of the plurality of vibration isolating elements 306, forming a plurality of chambers or cavities (not separately labeled. In an exemplary aspect, plurality of connecting elements 324 are integrally formed with central support 320 and corresponding ones of the plurality of vibration isolating elements 306.

In accordance with an exemplary embodiment, vibration isolating portion 304 includes a plurality of slots or cuts, one of which is indicated at 328 that promote torsional rotation of a first coupler portion (not shown) relative to a second coupler portion (also not shown) in a manner similar to that discussed herein. It should be understood that the plurality of slots do not extend an entire length of vibration isolating portion 304. It should also be understood that the number of slots may vary.

in an embodiment, one or more of the plurality of connecting elements 324 may include a passage 330 that facilitates fluid flow through vibration isolating coupler 300. Passage 330 may also accommodate a conductor. The fluid may take the form of drilling mud that passes to disintegrating tool 30. The drilling mud may pass through a mud motor (not shown) to provide motive force to disintegrating tool 30. The conductor may pass control signals between, for example, surface control unit 80 and downhole, subsurface tools, devices, sensors and the like.

In a manner similar to that discussed herein, a torsional input at the first coupler portion (not shown) of vibration isolating coupler 300 translates to a second coupler portion (also not shown). The plurality of slots 328 allow the first coupler portion to torsionally rotate relative to the second coupler portion through elastic bending or deformation of plurality of connecting elements 324 and torsion of central support 320. In an embodiment, central support 320 together with plurality of vibration isolating elements 306 and connecting elements 324 are formed integrally. Torsional rotation of the first coupler portion relative to the second coupler portion facilitated by the torsional softness of vibration isolating portion 304 reduces HFTO produced by disintegrating tool 30.

Figure 11:
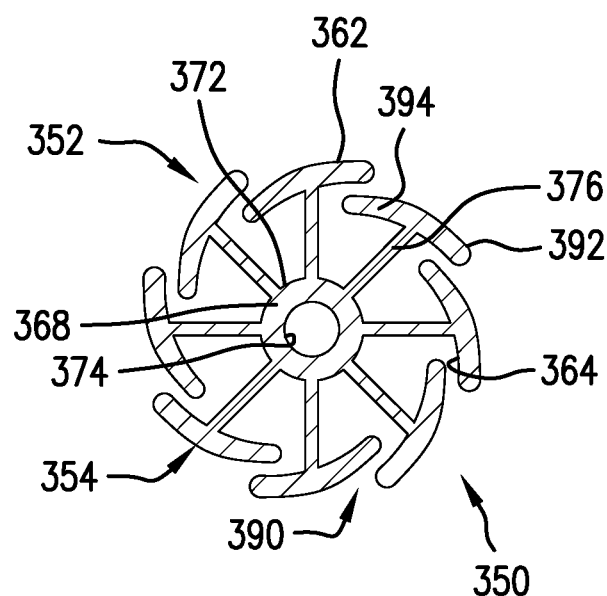
FIG. 11 depicts a cross-section of a vibration isolating coupler, in accordance with still yet another aspect of an exemplary embodiment.

FIG. 11 shows a vibration isolating coupler 350 in accordance with another aspect of an exemplary embodiment. Vibration isolating coupler 350 includes a vibration isolating portion 352 including a plurality of vibration isolating elements, one of which is indicated at 354. Each of the plurality of vibration isolating elements 354 includes an external surface 362 and an internal surface 364. A central support 368 extends through the central bore. Central support 368 includes an external surface portion 372 and a central passage 374.

In an embodiment, a plurality of connecting elements, one of which is indicated at 376 extend from external surface portion 372 of central support 368 and connects with a corresponding one of the plurality of vibration isolating elements 354 forming a plurality of chambers or cavities (not separately labeled. In an exemplary aspect, plurality of connecting elements 376 are integrally formed with central support 368 and corresponding ones of the plurality of vibration isolating elements 354.

In accordance with an exemplary embodiment, vibration isolating portion 352 includes a plurality of slots or cuts, one of which is indicated at 390 that promote torsional rotation of a first coupler portion (not shown) relative to second coupler portion (also not shown) in a manner similar to that discussed herein. It should be understood that the plurality of slots 390 do not extend an entire length of vibration isolating portion 352. It should be further understood that the number of slots 390 may vary.

Figure 7:
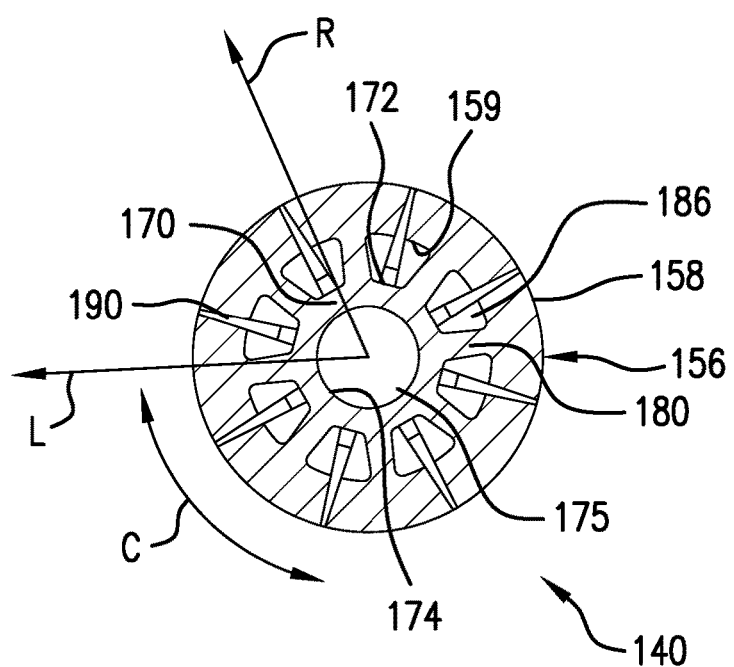
FIG. 7 depicts an axial end view of the portion of the vibration isolating coupler of FIG. 6, in accordance with an aspect of an exemplary embodiment.

In an exemplary embodiment, each of the plurality of vibration isolating elements 354 includes a first section 392 that extends outwardly of one of the plurality of connecting elements 376 in a first circumferential direction C (FIG. 7) and a second section 394 that extends outwardly of the one of the plurality of connecting elements 376 in a second circumferential direction. In an exemplary aspect, second section 394 is radially inwardly offset relative to first section 392. Radially inwardly refers to radial direction R (FIG. 7). In another exemplary aspect, first section 392 extending from the one of the plurality of connecting elements 376 overlaps with the second section 394 extending from an adjacent one of the plurality of connecting elements 376. The term adjacent in relation to a connecting element, a vibration isolating element or slot refers to a neighboring connecting element, vibration isolating element or slot.

In a manner similar to that discussed herein, a torsional input at a first coupler portion (not shown) translates to a second coupler portion (also not shown) The plurality of slots 390 allow the first coupler portion to torsionally rotate relative to the second coupler portion through elastic bending or deformation of plurality of connecting elements 376 in a manner similar to that discussed herein. In an embodiment, central support 368. each of the plurality of vibration isolating elements 354 together with plurality of connecting elements 376 are formed integrally. Torsional rotation of the first coupler portion relative to the second coupler portion facilitated by the torsional softness of vibration isolating portion 352 reduces HFTO produced by disintegrating tool 30.

Figure 12:
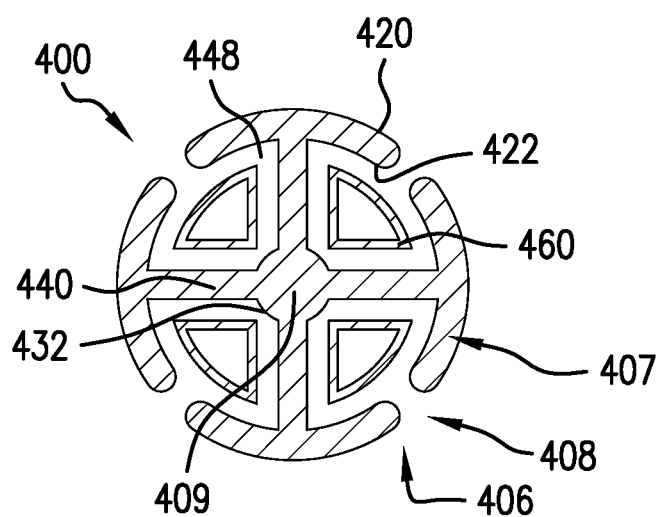
FIG. 12, depicts an axial end view of the portion of the vibration isolating coupler, in accordance with yet still another aspect of an exemplary embodiment.

FIG. 12 shows a vibration isolating coupler 400 in accordance with another aspect of an exemplary embodiment. Vibration isolating coupler 400 includes a vibration isolating portion 406 having a plurality of vibration isolating elements 407 separated one, from another, by a plurality of slots, one of which is indicated at 408. It should be understood that the plurality of slots 408 do not extend an entire length of vibration isolating portion 406. Further, the number of slots 408 may vary. Each of the plurality of vibration isolating elements 407 includes an external surface 420 and an internal surface 422 that defines a cavity (not separately labeled), A central support 409 is arranged in the central bore and includes an external surface portion 432 and a solid cross-section (not separately labeled).

In an embodiment, a plurality of connecting elements 440 extend from external surface portion 432 of central support 409 and connects with a corresponding one of the plurality of vibration isolating elements 407 forming a plurality of chambers or cavities 448. in an exemplary aspect, plurality of connecting elements 440 are integrally formed with the corresponding one of the plurality of vibration isolating elements 407 and central support 409.

In an exemplary embodiment, a conduit 460 extends through one or more of the plurality of cavities 448. Conduit 460 may facilitate passage of fluid or conductors through vibration isolating coupler 400. The fluid may take the form of drilling mud that passes to disintegrating tool 30. The drilling mud may pass through a mud motor (not shown) to provide motive force to disintegrating tool 30. The conductor may pass control signals between, for example, surface control unit 80 and downhole/subsurface tools, devices, sensors and the like.

In a manner similar to that discussed herein, a torsional input at a first coupler (not shown) of vibration isolating coupler 400 translates to a second coupler (also not separately labeled). The plurality of slots 408 allow the first coupler portion to torsionally rotate relative to the second coupler portion through elastic bending or deformation of plurality of connecting elements 440 and torsion of central support 409. In an embodiment, plurality of vibration isolating elements 407, central support 409 together with plurality of connecting elements 440 are formed integrally. Torsional rotation of the first coupler portion relative to second coupler portion facilitated by the torsional softness of vibration isolating portion 406 reduces HFTO produced by disintegrating tool 30.

Figure 13:
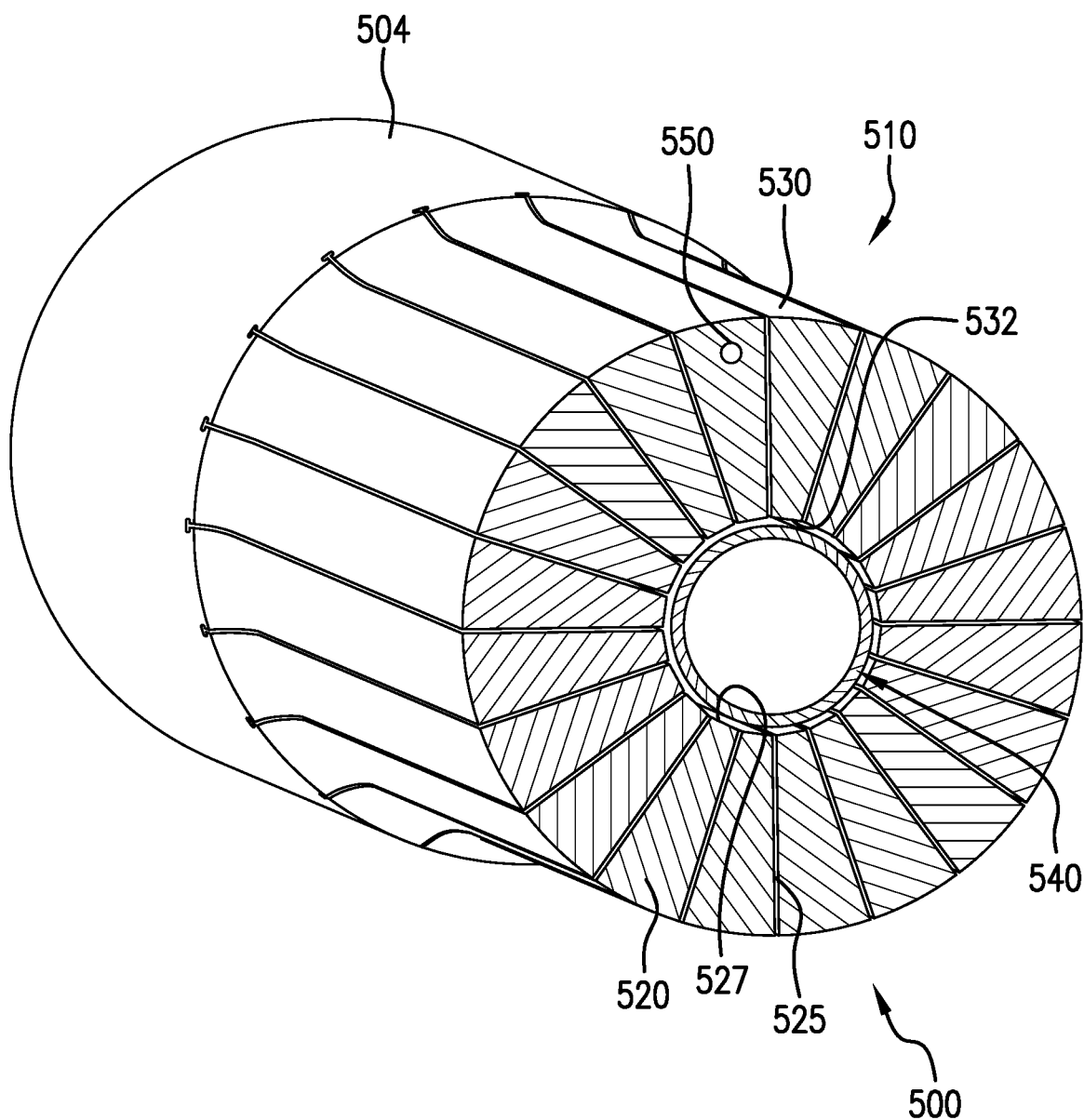
FIG. 13 depicts a cross-section of an end portion of a vibration isolating coupler, in accordance with still another aspect of an exemplary embodiment.

Reference will now follow to FIG. 13 in describing a vibration isolating coupler 500 in accordance with yet another aspect of an exemplary embodiment. Vibration isolating coupler 500 includes a first coupler portion 504 that extends to a second coupler portion (not shown) through a vibration isolating portion 510. Vibration isolating portion 510 includes a plurality of vibration isolating elements, one of which is indicated at 520 separated one, from another, by a plurality of slots, one of which is indicated at 525. It should be understood that the plurality of slots 525 do not extend an entire length of vibration isolating portion 510. Further, the number of slots 525 may vary. The first coupler portion 504 and the second coupler portion (not shown) do not include slots. The portion of the first coupler portion and the portion of the second coupler portion that are not including slots are comprising a closed outer surface and. may comprise a solid annular portion surrounding a central passage inside the first and second coupler portion. The first coupler portion 504 and the second coupler portion (not shown) each include a passage to transfer fluid.

Each of the plurality of vibration isolating elements 520 includes an external surface 530 and an internal surface 532 that defines an annular cavity 527. A conduit 540, also referred to as a liner, extends through in the annular cavity. In an embodiment, conduit 540 may be spaced from internal surface 532. Liner 540 may facilitate passage of fluid through vibration isolating coupler 500 and connect to the central passage in first and second coupler portions. The fluid may take the form of drilling mud that passes to disintegrating tool 30. The drilling mud may pass through a mud motor (not shown) to provide motive force to disintegrating tool 30. In addition, one or more of the plurality of vibration isolating elements 520 may include a passage 550 that received one or more conductors which may pass control signals between, for example, surface control unit 80 and downhole/subsurface tools, devices, sensors and the like. Liner 540, the plurality of vibration isolating elements 520, and solid annular portion may be integrally formed. Finite element simulation (FE simulation, FE modeling) may be used to model vibration isolating couplers with different material properties, dimensions and shapes of different portions of the vibration isolating coupler 140 (e.g. number, dimension and shape of the vibration isolating elements, or number, length and width of the slots, or configuration of the central support) to optimize and fine-tune the ratio of bending stiffness to torsional stiffness (BST/TST) to be as big as possible, e.g. a ration of bigger than 15.

Set forth below are some embodiments of the foregoing disclosure:

Embodiment 1. A vibration isolating coupler for reducing high frequency torsional oscillations in a drill string comprising: a first coupler portion including an external surface and an internal surface; a second coupler portion including an external surface and an internal surface portion; and a vibration isolating portion extending between the first coupler portion and the second coupler portion, the vibration isolating portion including a first solid annular portion defining a first terminal end of the vibration isolating portion and a second solid annular portion defining a second terminal end of the vibration isolating portion, the vibration isolating portion including a plurality of slots extending from the first solid annular portion toward the second solid annular portion forming a plurality of vibration isolating elements, each of the plurality of vibration isolating elements is disconnected from adjacent ones of the plurality of vibration isolating elements by a corresponding one of the plurality of slots, the plurality of vibration isolating elements enabling torsional rotation of the first coupler portion relative to the second coupler portion.

Embodiment 2. The vibration isolating coupler according to any prior embodiment, further comprising: a central support, wherein each of the plurality of vibration isolating elements is coupled to the central support through a corresponding one of a plurality of connecting elements.

Embodiment 3. The vibration isolating coupler according to any prior embodiment, wherein the central support includes a central passage.

Embodiment 4. The vibration isolating coupler according to any prior embodiment, wherein the central support includes an external surface portion and a solid cross-section.

Embodiment 5. The vibration isolating coupler according to any prior embodiment, wherein each of the plurality of vibration isolating elements, connecting elements, and the central support is integrally formed.

Embodiment 6. The vibration isolating coupler according to any prior embodiment, wherein one of at least one of the plurality of vibration isolating elements and at least one of the plurality of connecting elements includes a passage, wherein the passage extends from the first coupler portion and the second coupler portion.

Embodiment 7. The vibration isolating coupler according to any prior embodiment, wherein the first coupler portion and the second coupler portion include a threaded portion.

Embodiment 8. The vibration isolating coupler according to any prior embodiment, wherein the vibration isolating coupler includes a longitudinal axis and the plurality of slots extending substantially parallel to the longitudinal axis.

Embodiment 9. The vibration isolating coupler according to any prior embodiment, further comprising: a plurality of cavities defined between adjacent ones of the plurality of connecting elements.

Embodiment 10. The vibration isolating coupler according to any prior embodiment, further comprising a conduit arranged in at least one of the plurality of cavities, the conduit extending through the vibration isolating coupler.

Embodiment 11. The vibration isolating coupler according to any prior embodiment, wherein each of the plurality of vibration isolating elements includes a first section that extends outwardly of one of the plurality of connecting elements in a first direction and a second section that extends outwardly of the one of the plurality of connecting elements in a second direction.

Embodiment 12. The vibration isolating coupler according to any prior embodiment, wherein the second section is radially inwardly offset relative to the first section.

Embodiment 13. The vibration isolating coupler according to any prior embodiment, wherein the vibration isolating portion is integrally formed from different materials.

Embodiment 14. The vibration isolating coupler according to any prior embodiment, wherein each of the plurality of vibration isolating elements includes an external surface and an internal surface, the internal surface of each of the plurality of vibration isolating elements defines an annular cavity.

Embodiment 15. The vibration isolating coupler according to any prior embodiment, further comprising: a liner passing through the annular cavity, the liner being spaced from the internal surface of the vibration isolating elements, wherein the liner includes a fluid passage.

Embodiment 16. The vibration isolating coupler according to claim 1, wherein the vibration isolating portion is integrally formed with first coupler portion and the second coupler portion.

Embodiment 17. A method of isolating high frequency torsional vibrations from one portion of a drill string connected to another portion of the drill string through a vibration isolating coupler having a first coupler portion connected to a second coupler portion through a vibration isolating portion having a plurality of slots defining a plurality of vibration isolating elements, the method comprising: introducing a torsional vibration into the first coupler portion; and isolating the torsional vibration from the second coupler portion by torsional oscillation of the vibration isolating portion.

Embodiment 18. The method according to any prior embodiment, wherein torsionally oscillating the vibration isolating portion includes elastically bending the plurality of vibration isolating elements.

Embodiment 19. The method according to any prior embodiment, further comprising: passing a fluid from the first coupler portion through the second coupler portion.

Embodiment 20. The method according to any prior embodiment, wherein passing the fluid includes directing the fluid through a central passage extending through the vibration isolating portion.

Embodiment 21. The method according to any prior embodiment, wherein the plurality of vibration isolating elements are coupled to a central support through a plurality of connecting elements and wherein each of the plurality of vibration isolating elements, connecting elements, and the central support is integrally formed.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The teachings of the present disclosure may be used in a variety of well operations. These operations may involve using one or more treatment agents to treat a formation, the fluids resident in a formation, a wellbore, and or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A vibration isolating coupler for reducing high frequency torsional oscillations in a drill string comprising:
    a first coupler portion including an external surface and an internal surface;
    a second coupler portion including an external surface and an internal surface portion; and
    a vibration isolating portion extending between the first coupler portion and the second coupler portion, the vibration isolating portion including a first solid annular portion defining a first terminal end of the vibration isolating portion and a second solid annular portion defining a second terminal end of the vibration isolating portion, the vibration isolating portion including a central support and a plurality of slots extending from the first solid annular portion toward the second solid annular portion forming a plurality of vibration isolating elements, each of the plurality of slots including a longitudinal length and a circumferential width, the longitudinal length being greater than the circumferential width, each of the plurality of vibration isolating elements is disconnected from adjacent ones of the plurality of vibration isolating elements by a corresponding one of the plurality of slots, the plurality of vibration isolating elements enabling torsional rotation of the first coupler portion relative to the second coupler portion, wherein each of the plurality of vibration isolating elements is coupled to the central support through a corresponding one of a plurality of connecting elements.

2. The vibration isolating coupler according to claim 1, wherein the central support includes a central passage.

3. The vibration isolating coupler according to claim 1, wherein the central support includes an external surface portion and a solid cross-section.

4. The vibration isolating coupler according to claim 1, wherein each of the plurality of vibration isolating elements, connecting elements, and the central support is integrally formed.

5. The vibration isolating coupler according to claim 4, wherein the vibration isolating portion is integrally formed from different materials.

6. The vibration isolating coupler according to claim 1, wherein one of at least one of the plurality of vibration isolating elements and at least one of the plurality of connecting elements includes a passage, wherein the passage extends from one of the first coupler portion and the second coupler portion.

7. The vibration isolating coupler according to claim 1, wherein the first coupler portion and the second coupler portion include a threaded portion.

8. The vibration isolating coupler according to claim 1, wherein the vibration isolating coupler includes a longitudinal axis and the plurality of slots extending substantially parallel to the longitudinal axis.

9. The vibration isolating coupler according to claim 1, further comprising:
a plurality of cavities defined between adjacent ones of the plurality of connecting elements.

10. The vibration isolating coupler according to claim 9, further comprising a conduit arranged in at least one of the plurality of cavities, the conduit extending through the vibration isolating coupler.

11. The vibration isolating coupler according to claim 1, wherein each of the plurality of vibration isolating elements includes a first section that extends outwardly of one of the plurality of connecting elements in a first direction and a second section that extends outwardly of the one of the plurality of connecting elements in a second direction.

12. The vibration isolating coupler according to claim 11, wherein the second section is radially inwardly offset relative to the first section.

13. The vibration isolating coupler according to claim 1, wherein the vibration isolating portion is integrally formed with first coupler portion and the second coupler portion.

14. The vibration isolating coupler according to claim 1, wherein the plurality of connecting elements includes at least three connecting elements.

15. The vibration isolating coupler according to claim 1, wherein each of the plurality of slots includes a first terminal end portion and a second terminal end portion, at least one slot of the plurality of slots comprises a transition zone in at least one of the first terminal end portion and the second terminal end portion, the transition zone including a transition to the corresponding one of the first solid annular portion and the second solid annular portion, wherein the transition zone includes at least one radius.

16. A method of isolating high frequency torsional vibrations from one portion of a drill string connected to another portion of the drill string through a vibration isolating coupler having a first coupler portion connected to a second coupler portion through a vibration isolating portion having a plurality of slots defining a plurality of vibration isolating elements, each of the plurality of slots including a longitudinal length and a circumferential width, the longitudinal length being greater than the circumferential width, each of the plurality of vibration isolating elements is coupled to a central support through a corresponding one of a plurality of connecting elements, the method comprising:

introducing a torsional vibration into the first coupler portion; and
isolating the torsional vibration from the second coupler portion by torsional oscillation of the vibration isolating portion.

17. The method of claim 16, wherein torsionally oscillating the vibration isolating portion includes elastically bending the plurality of vibration isolating elements.

18. The method of claim 16, further comprising:
passing a fluid from the first coupler portion through the second coupler portion.

19. The method of claim 18, wherein passing the fluid includes directing the fluid through a central passage extending through the vibration isolating portion.

20. The method of claim 18, wherein each of the plurality of vibration isolating elements, connecting elements, and the central support is integrally formed.

21. A vibration isolating coupler for reducing high frequency torsional oscillations in a drill string comprising:
a first coupler portion including an external surface and an internal surface;
a second coupler portion including an external surface and an internal surface; and
a vibration isolating portion extending between the first coupler portion and the second coupler portion, the vibration isolating portion including a first solid annular portion defining a first terminal end of the vibration isolating portion and a second solid annular portion defining a second terminal end of the vibration isolating portion, the vibration isolating portion including a plurality of slots extending from the first solid annular portion toward the second solid annular portion forming a plurality of vibration isolating elements, each of the plurality of slots including a longitudinal length and a circumferential width, the longitudinal length being greater than the circumferential width, each of the plurality of vibration isolating elements is disconnected from adjacent ones of the plurality of vibration isolating elements by a corresponding one of the plurality of slots, the plurality of vibration isolating elements enabling torsional rotation of the first coupler portion relative to the second coupler portion,
wherein each of the plurality of vibration isolating elements includes an external surface and an internal surface, the internal surface of each of the plurality of vibration isolating elements defining an annular cavity, and
wherein a liner passes through the annular cavity, the liner being spaced from the internal surface of the vibration isolating elements, wherein the liner is including a fluid passage.

* * * * *